US009575536B2

(12) United States Patent
Rajappa et al.

(10) Patent No.: US 9,575,536 B2
(45) Date of Patent: Feb. 21, 2017

(54) METHODS AND APPARATUS TO ESTIMATE POWER PERFORMANCE OF A JOB THAT RUNS ON MULTIPLE NODES OF A DISTRIBUTED COMPUTER SYSTEM

(71) Applicants: Muralidhar Rajappa, Chandler, AZ (US); Andy Hoffman, Olympia, WA (US); Devadatta Bodas, Federal Way, WA (US); Justin Song, Olympia, WA (US); James Alexander, Hillsboro, OR (US); Joseph A. Schaefer, Beaverton, OR (US); Sunil Mahawar, Portland, OR (US)

(72) Inventors: Muralidhar Rajappa, Chandler, AZ (US); Andy Hoffman, Olympia, WA (US); Devadatta Bodas, Federal Way, WA (US); Justin Song, Olympia, WA (US); James Alexander, Hillsboro, OR (US); Joseph A. Schaefer, Beaverton, OR (US); Sunil Mahawar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 14/582,795

(22) Filed: Dec. 24, 2014

(65) Prior Publication Data

US 2016/0054775 A1   Feb. 25, 2016

Related U.S. Application Data

(60) Provisional application No. 62/040,576, filed on Aug. 22, 2014.

(51) Int. Cl.
*G06F 1/26* (2006.01)
*G06F 1/32* (2006.01)
(Continued)

(52) U.S. Cl.
CPC ............. *G06F 1/3203* (2013.01); *G05B 15/02* (2013.01); *G06F 1/30* (2013.01); *G06F 1/329* (2013.01);
(Continued)

(58) Field of Classification Search
CPC ................................ G06F 1/26; G06F 9/5094
(Continued)

(56) References Cited

U.S. PATENT DOCUMENTS

| 5,388,265 A | 2/1995 | Volk |
| 5,598,537 A | 1/1997 | Swanstrom et al. |

(Continued)

FOREIGN PATENT DOCUMENTS

| WO | WO-02/19078 | 3/2002 |
| WO | WO-2004/070619 | 8/2004 |

(Continued)

OTHER PUBLICATIONS

PCT International Search Report and Written Opinion for PCT/US2015/036435, mailed Sep. 18, 2015, (16 pages).
(Continued)

*Primary Examiner* — Vincent Tran
(74) *Attorney, Agent, or Firm* — Blakely, Sokoloff, Taylor & Zafman LLP

(57) ABSTRACT

A non-transitory computer readable storage medium having stored thereon instructions executable by one or more processors to perform operations including: receiving a plurality of input parameters including (i) a workload type, (ii) a list of selected nodes belonging to a distributed computer system, and (iii) a list of frequencies; responsive to receiving the plurality of workload parameters, retrieving calibration data from a calibration database; generating a power estimate based on the plurality of workload parameters and the calibration data; and providing the power estimate to a
(Continued)

resource manager is shown. Alternatively, the input parameters may include (i) a workload type, (ii) a list of selected nodes belonging to a distributed computer system, and (iii) an amount of available power, wherein the estimator may provide an estimation of the frequency at which the nodes should operate to utilize as much of the available power without exceeding the available power.

17 Claims, 9 Drawing Sheets

(51) Int. Cl.
| | |
|---|---|
| H04L 12/24 | (2006.01) |
| G05B 15/02 | (2006.01) |
| G06F 1/30 | (2006.01) |
| G06Q 50/06 | (2012.01) |
| G06F 9/48 | (2006.01) |
| H04L 12/911 | (2013.01) |
| G06F 9/50 | (2006.01) |

(52) U.S. Cl.
CPC .......... *G06F 1/3209* (2013.01); *G06F 1/3228* (2013.01); *G06F 1/3234* (2013.01); *G06F 1/3296* (2013.01); *G06F 9/4881* (2013.01); *G06F 9/4893* (2013.01); *G06F 9/5094* (2013.01); *G06Q 50/06* (2013.01); *H04L 41/0833* (2013.01); *H04L 47/783* (2013.01); *H04L 47/821* (2013.01)

(58) Field of Classification Search
USPC ........................................ 713/320
See application file for complete search history.

(56) References Cited

U.S. PATENT DOCUMENTS

| | | | |
|---|---|---|---|
| 5,752,050 | A | 5/1998 | Hernandez et al. |
| 5,784,628 | A | 7/1998 | Reneris |
| 5,842,027 | A | 11/1998 | Oprescu et al. |
| 5,905,900 | A | 5/1999 | Combs et al. |
| 6,125,450 | A | 9/2000 | Kardach |
| 6,745,335 | B1 | 6/2004 | Kusano |
| 6,760,852 | B1 | 7/2004 | Gulick |
| 6,971,033 | B2 | 11/2005 | Ma |
| 7,028,200 | B2 | 4/2006 | Ma |
| 7,111,179 | B1 | 9/2006 | Girson et al. |
| 7,143,300 | B2 | 11/2006 | Potter et al. |
| 7,861,068 | B2 | 12/2010 | Gorbatov et al. |
| 8,001,403 | B2 | 8/2011 | Hamilton et al. |
| 8,060,762 | B2 | 11/2011 | Banginwar et al. |
| 2002/0194251 | A1 | 12/2002 | Richter et al. |
| 2003/0041272 | A1 | 2/2003 | Nguyen |
| 2003/0163745 | A1 | 8/2003 | Kardach |
| 2003/0221026 | A1 | 11/2003 | Newman |
| 2004/0022225 | A1 | 2/2004 | Liang et al. |
| 2004/0025063 | A1 | 2/2004 | Riley |
| 2005/0113103 | A1 | 5/2005 | Snowden et al. |
| 2005/0136961 | A1 | 6/2005 | Simonsson et al. |
| 2005/0138438 | A1 | 6/2005 | Bodas |
| 2005/0273633 | A1 | 12/2005 | Wilcox et al. |
| 2007/0240160 | A1 | 10/2007 | Paterson-Jones |
| 2007/0245161 | A1 | 10/2007 | Shaw et al. |
| 2008/0209243 | A1 | 8/2008 | Ghiasi et al. |
| 2009/0049313 | A1* | 2/2009 | Gooding ............... G06F 1/3203 713/300 |
| 2009/0113221 | A1 | 4/2009 | Holle et al. |
| 2009/0138219 | A1 | 5/2009 | Bletsch et al. |
| 2009/0254660 | A1 | 10/2009 | Hanson et al. |
| 2009/0265568 | A1 | 10/2009 | Jackson |
| 2010/0205469 | A1 | 8/2010 | McCarthy et al. |
| 2010/0235840 | A1* | 9/2010 | Angaluri ............... G06F 1/329 8/102 |
| 2010/0257531 | A1 | 10/2010 | Barsness et al. |
| 2010/0313203 | A1 | 12/2010 | Dawson et al. |
| 2011/0022868 | A1 | 1/2011 | Harchol-Balter et al. |
| 2011/0161696 | A1* | 6/2011 | Fletcher ............... G06F 1/3203 713/320 |
| 2011/0167425 | A1 | 7/2011 | Lurie et al. |
| 2011/0178652 | A1 | 7/2011 | Carter et al. |
| 2012/0005683 | A1 | 1/2012 | Bower, III et al. |
| 2012/0084580 | A1 | 4/2012 | Harchol-Balter et al. |
| 2012/0165963 | A1 | 6/2012 | Kim et al. |
| 2013/0103968 | A1 | 4/2013 | Conroy et al. |
| 2013/0139172 | A1 | 5/2013 | An et al. |
| 2013/0185576 | A1 | 7/2013 | Brundridge et al. |
| 2014/0059556 | A1* | 2/2014 | Barsness ............... G06F 1/3203 718/102 |
| 2014/0075222 | A1 | 3/2014 | Jackson |
| 2014/0075448 | A1* | 3/2014 | Bell, Jr. ............... G06F 9/5094 718/104 |
| 2014/0114107 | A1 | 4/2014 | Gami |
| 2014/0149768 | A1 | 5/2014 | Kansal et al. |
| 2014/0245054 | A1 | 8/2014 | Hamdi et al. |
| 2014/0282425 | A1 | 9/2014 | Zhao et al. |
| 2015/0067693 | A1* | 3/2015 | Yamazaki ............. G06F 9/4893 718/103 |
| 2015/0169026 | A1 | 6/2015 | Bodas et al. |
| 2015/0248312 | A1* | 9/2015 | Brochard ............. G06F 9/4893 718/103 |
| 2016/0011914 | A1 | 1/2016 | Bohn |

FOREIGN PATENT DOCUMENTS

| | | |
|---|---|---|
| WO | WO-2006/007146 | 1/2006 |
| WO | WO-2013/172816 | 11/2013 |
| WO | WO 2014-053610 A1 | 4/2014 |

OTHER PUBLICATIONS

Bodas, Deva., et al., "Simple Power-Aware Scheduler to limit power consumption by HPC system within a budget," E2SC '14 Proceedings of the 2nd International Workshop on Energy Efficient Supercomputing, pp. 21-30, Oct. 2014.

Alvarruiz, F. de Alfonso, C., Calballer, M. and Hernández, V. 2012. *An Energy Manager for High Performance Computer Clusters*, ISPA '12 Proceedings of the 2012 IEEE 10th International Symposium on Parallel and Distributed Processing with Applications.

Bhattacharya, A. 2013. *Constraints And Techniques For Software Power Management In Production Clusters*. Technical Report No. UCB/EECS-2013-110, Electrical Engineering and Computer Sciences, University of California at Berkeley. http://www.eecs.berkeley.ed.

Brehm, M. 2013. *Energy Aware Scheduling SuperMUC@ LRZ*. Application Support Group. Leibniz Supercomputing Centre. http://www.autotune-project.eu/system/files/Matthias_Brehm_Energietag.pdf.

Cai, C., Wang, L. Khan, S. and Tao, J. 2011. *Energy-aware High Performance Computing—A Taxonomy Study*. Parallel and Distributed Systems (ICPADS), 2011 IEEE 17th International Conference on. (Tainan, Taiwan. Dec. 7, 2009.

Department of Energy. 2013. *CORAL procurement benchmarks*. LLNL-PRE-637694. (May 31, 2013). https://asc.llnl.gov/CORAL-benchmarks/CORALBenchmarksProcedure-v26.pdf.

Etinski, M., Corbalan, J. and Labarta, J. *Power-Aware Parallel Job Scheduling*. Barcelona Supercomputing Center. http://nsfcac.rutgers.edu/GreenHPC/EEHiPC/eehipc_etinski.pdf.

HP, Intel, Microsoft, Phoenix, Toshiba. 2011. *Advanced Configuration and Power Interface Specification Revision 5.0*. http://www.acpi.info/DOWNLOADS/ACPIspec50.pdf.

Intel® Corp. 2014. Intel® 64 and IA-32 Architectures Software Developer Manuals. Vol. 2 (2A, 2B, & 2C), total 1,495 pages. http://www.intel.com/content/www/us/en/processors/architectures-software-developer-manuals.html.

Lefurgy, C., Allen-Ware, M., Carter, J., El-Essawy, W., Felter, W., Ferreira, A., Huang, W., Hylick, A., Keller, T., Rajamani, K.,

(56) References Cited

OTHER PUBLICATIONS

Rawson F. and Rubio, J. 2011. *Energy-Efficient Data Centers and Systems.* 2011 IEEE International Symposium on Workload Charac.
Mämmelä, O., Majanen, M., Basmadjian, R., De Meer, H., Giesler, A. and Homberg, W. *Energy-aware job scheduler for high-performance computing.* Computer Science—Research and Development 27, No. 4 (2012): 265-275.
Matthieu, H. *Power capping in SLURM.* Green days @ life, (Nov. 2013).
Rountree, B., Ahn, D., de Supinski, B., Lowenthal, D. and Schulz, M. 2012. *Beyond DVFS: A First Look at Performance Under a Hardware-Enforced Power Bound.* 8th Workshop on High-Performance, Power-Aware Computing (HPPAC). (May 2012). https://e-reports-ext.II.
2013. *Slurm Workload Manager.* (Nov. 2013). http://slurm.schedmd.com.
Yoo, A., Jetter, M. and Grondona, M. 2003. *SLURM: Simple Linux utility for resource management.* In, Feitelson, D., Rudolph, L. and Schwiegelshohn, U. editors. Job Scheduling Strategies for Parallel Processing. 9th Springer Verlag International Workshop. JS.
Zhou, Z., Lan, Z., Tang, W. and Desai, N. 2013. *Reducing Energy Costs for IBM Blue Gene/P via Power-Aware Job Scheduling.* Department of Computer Science, Illinois Institute of Technology; Mathematics and Computer Science Division, Argonne National Laborato.
PCT Notification of Transmittal of the International Search Report and the Written Opinion of the International Searching Authority or the Declaration for PCT Counterpart Application No. PCT/US2012/037812, 10 pgs., (Jan. 23, 2013).
PCT Notification concerning Transmittal of International Preliminary Report on Patentability (Chapter I of the Patent Cooperation Treaty) for PCT Counterpart Application No. PCT/US2012/037812, 7 pgs., (Nov. 27, 2014).
PCT Written Opinion of the International Searching Authority for PCT Counterpart Application No. PCT/US2012/038405 5 pgs., (Feb. 28, 2013).
PCT International Search Report and Written Opinion received for PCT Patent Application No. PCT/US2012/038405, mailed on May 17, 2012, 3 pages.
PCT Notification concerning Transmittal of International Preliminary Report on Patentability (Chapter I of the Patent Cooperation Treaty) for PCT Counterpart Application No. PCT/US2012/038405, 7 pgs., (Nov. 27, 2014).
First Office Action (and English translation) from CN Application No. 200410101227.1, mailed Dec. 1, 2006, 27 pgs.
Office Action issued in U.S. Appl. No. 10/859,892, mailed Jul. 25, 2006, 10 pgs.
Office Action issued in U.S. Appl. No. 10/859,892, mailed Dec. 6, 2006, 9 pgs.
Abstract from W00219078, corresponding to reference CN 1449517A, 7 pgs.
Office Action from UK Patent Application No. 0425264.9, mailed Sep. 22, 2006, 6 pgs.
Office Action from UK Patent Application No. 0609876.8, mailed Sep. 22, 2006, 5 pgs.
Office Action from U.S. Appl. No. 10/871,638, mailed Sep. 28, 2006, 13 pgs.
Deva Bodas, et al, "Simple Power-Aware Scheduler to Limit Power Consumption by HPC System within a Budget," Intel Corporation (U.S. Appl. No. 62/040,576). 10 pages.
Final Office Action issued in U.S. Appl. No. 14/582,772, mailed Jul. 15, 2016, (Jul. 15, 2016), 13.
"Office Action issued in U.S. Appl. No. 13/582,772, mailed Feb. 25, 2016", (Feb. 25, 2016), 15 pgs.
"Office Action issued in U.S. Appl. No. 14/582,756, mailed Aug. 25, 2016", 26.
"Office Action issued in U.S. Appl. No. 14/582,756, mailed Feb. 16, 2016", 22.
"Office Action issued in U.S. Appl. No. 14/582,764, mialed Jun. 13, 2016", 16.

\* cited by examiner

FIG. 4A

| | NO POWER LIMIT (422) | FIXED-FREQUENCY (423) | MINIMUM POWER (424) | AUTO-MODE (425) | MAXIMUM POWER (426) |
|---|---|---|---|---|---|
| AVAILABLE POWER | | $P_{AVAILABLE} = P_{SYS} -$ ALLOCATED POWER | | | |
| STARTUP POWER | PMP | PMP at $F_S$ | $P_{MIN}$ | PMP at $F_{MIN}$ | PMP at $F_{MIN}$ when PMP at $F_{MIN} < P_{MAX}$; or $P_{MAX}$ |
| FREQUENCY | MAXIMUM | $F_S$ | $F_{O\_1}$; MAX FREQUENCY WHERE PMP $\leq P_{AVAILABLE}$ | | $F_{O\_2}$; MAX FREQUENCY WHERE PMP $\leq \min(P_{AVAIL}, P_{MAX})$ |
| MINIMUM REQUIRED POWER | PMP | = 0 OR = PMP at $F_S$ | = 0 OR = MAX (PMP at $F_{MIN}$, $P_{MIN}$) | = 0 OR = PMP at $F_{MIN}$ | |
| ALLOCATED POWER | PMP | PMP at $F_S$ | MAX (MIN REQUIRED POWER, PMP at $F_{O\_1}$) | | MIN ($P_{MAX}$, PMP at $F_{O\_2}$) |

| AVAILABLE POWER | NO POWER LIMIT | FIXED-FREQUENCY | MINIMUM POWER | AUTO-MODE | MAXIMUM POWER |
|---|---|---|---|---|---|
| | $P_{AVAILABLE} = P_{SYS} - P_{CONSUMED}$ – GUARD BAND (GB) | | | | |
| STARTUP POWER | WORKLOAD MAX + GB | WORKLOAD MAX at $F_S$ | $P_{MIN}$ | WORKLOAD AVE at $F_{MIN}$ | WORKLOAD AVE at $F_{MIN}$ WHEN WORKLOAD AVE at $F_{MIN} < P_{MAX}$; or $P_{max}$ |
| FREQUENCY | MAXIMUM | $F_S$ | | $F_{O\_3}$; MAX FREQUENCY WHERE WORKLOAD AVE $\leq P_{AVAILABLE}$ | $F_{O\_4}$; MAX FREQUENCY WHERE WORKLOAD MAX $\leq$ MIN $(P_{AVAIL}, P_{MAX})$ |
| MINIMUM REQUIRED POWER | WORKLOAD MAX + GB | = 0 OR = WORKLOAD MAX AT $F_S$ | = 0 OR = MAX (WORKLOAD MAX at $F_{MIN}$, $P_{MIN}$) | = 0 OR = WORKLOAD MAX at $F_{MIN}$ | |
| ALLOCATED POWER | WORKLOAD MAX + GB | WORKLOAD MAX at $F_S$ | MAX (MIN REQUIRED POWER, WORKLOAD AVE at $F_{O\_3}$) | | MIN (WORKLOAD MAX at $F_{O\_4}$, $P_{MAX}$) |

METHODS AND APPARATUS TO ESTIMATE POWER PERFORMANCE OF A JOB THAT RUNS ON MULTIPLE NODES OF A DISTRIBUTED COMPUTER SYSTEM

CROSS-REFERENCE TO RELATED APPLICATIONS

The present application claims the benefit of prior U.S. Provisional Patent Application No. 62/040,576, entitled "SIMPLE POWER-AWARE SCHEDULER TO LIMIT POWER CONSUMPTION BY HPC SYSTEM WITHIN A BUDGET" filed on Aug. 22, 2014, which is hereby incorporated by reference in its entirety.

The present application is related to U.S. Publication No. 2016/0054783, entitled "Method and Apparatus to Generate and Use Power, Thermal and Performance Characteristics of Nodes to Improve Energy Efficiency and Reducing Wait Time for Jobs in the Queue" filed Dec. 24,2014; U.S. Publication No. 2016/0188379, entitled "Adjustment of Execution of Tasks" filed Dec. 24,2014; U.S. Publication No. 2016/0187906, entitled "Control of Power Consumption" filed Dec. 24,2014; U.S. Publication No. 2016/0187395, entitled "Forecast for Demand of Energy" filed Dec. 24,2014; U.S. Publication No. 2016/0054781, entitled "Methods and Apparatus to Manage Jobs That Can and Cannot be Suspended When There is a Change in Power Allocation to a Distributed Computer System" filed Dec 24,2014; U.S. Publication No. 2016/0054779, entitled "Managing Power Performance of Distributed Computing Systems" filed Dec. 24,2014; U.S. Publication No. 2016/0054774, entitled "Profiling a Job Power and Energy Consumption for a Data Processing System" filed Dec. 24,2014; U.S. Publication No. 2016/0054780, entitled "Power Aware Job Scheduler and Manager for a Data Processing System" filed Dec. 24,2014.

FIELD

Embodiments of the disclosure generally relate to the field of power conservation in distributed computer systems. More specifically, one embodiment of the disclosure relates to estimating the power performance of a job to be run on multiple nodes within a distributed computer system to improve job scheduling and monitoring of the jobs processed by the distributed computer system.

GENERAL BACKGROUND

A distributed computer system may perform parallel computing by the simultaneous use of multiple nodes to execute a computational assignment referred to as a job. Each node may include one or more processors, memory, an operating system, and one or more input/output (I/O) components. The nodes may communicate with each other through a high speed network fabric, e.g., an Ethernet, an Omni-Path, an InfiniBand, or other network, and may use shared file systems or storage. The job may be divided into thousands of parallel tasks distributed over thousands of nodes. These nodes may synchronize with each other hundreds of times a second.

Future distributed computer systems are projected to require tens of megawatts of power, making their power management as a foremost concern in the industry. These distributed computer systems will be expected to deliver exascale performance with limited power and energy budgets. Current distributed computer systems may apply power capping to adhere to the limited power and energy budgets. However, current approaches to power capping negatively impact the performance of the distributed computer systems due to typically inaccurate power capping.

Current approaches estimate the power needed by one or more nodes of a distributed computer system to run a job based upon the thermal dissipation power (TDP) value of the one or more components comprising each node. As it is rare that a job actually uses the TDP value of each node on which the job is run, the estimation using the TDP values results in an over-estimate. By over-estimating the power needed to startup and run a job, current approaches delay the start of the job and reduce the efficiency of the distributed computer system by preventing other jobs from running.

The start of running a job is delayed as the over-estimation of the necessary power to start the job causes the distributed computer system to delay the start of the job until the over-estimated startup power is available. Alternatively, a more accurate estimation of the startup power would avoid a delay of running the job. In addition, the over-estimation of the power required to run the job results in an over-allocation of power for the job. The over-allocation takes away from power that could be allocated to other jobs requesting to be run by the distributed computer system.

In addition, the TDP is not the maximum power that may be consumed by a node. For example, TDP does not accurately measure the electrical power consumption when every component of the node is being used but measures the thermal dissipation. Therefore, it is possible that a job request may consume more power than the TDP estimate which may lead to the distributed computer system attempting to consume more power than it has been allocated by a utility facility.

BRIEF DESCRIPTION OF THE DRAWINGS

Embodiments of the invention are illustrated by way of example and not by way of limitation in the figures of the accompanying drawings, in which like references indicate similar elements and in which:

FIG. 4A is a table illustrating exemplary parameters used in determining resources necessary to run a job when power monitoring is not implemented.

FIG. 4B is a table illustrating exemplary parameters used in determining resources necessary to run a job when power monitoring is implemented.

DETAILED DESCRIPTION

Figure 1:
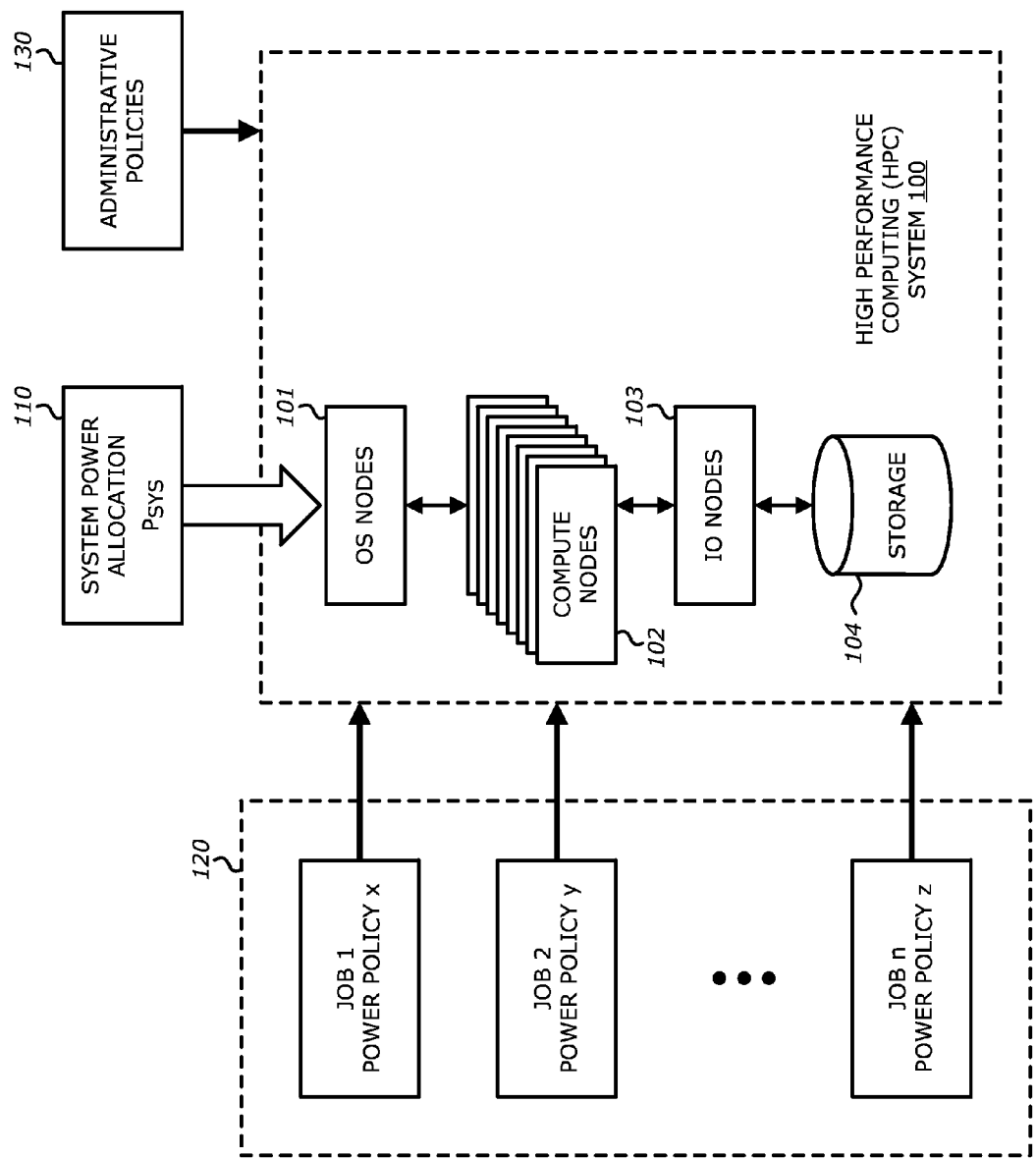
FIG. 1 is an exemplary block diagram of a HPC system receiving various inputs.

Various embodiments of the disclosure relate to estimating the power performance of a job that is to be run on a distributed computer system. An estimation of the power performance of a job may be determined based on, at least in part, whether the owner of the job permits the job to be subject to a power limit, the job power policy limiting the power supplied to the job, whether the owner of the job permits the job to be suspended and/or calibration data of the one or more nodes of the distributed computer system on which the job is to run. The distributed computer system may be, for example, a High Performance Computing (HPC) system. In some embodiments of the disclosure, a job may not be subjected to a power policy that limits the power supplied to a job as set forth by the owner of the job; however, a HPC system may, and likely will, have an overall limited power budget that cannot be exceeded by the combination of jobs processed by the HPC system.

Embodiments of the disclosure relate to estimating the startup power and/or minimum power required to run a job based on the actual power measurement for each node on which the job will run which takes into consideration the part-to-part variation between nodes. Other embodiments of the disclosure relate to estimating the startup power and/or minimum power required to run a job based on measurements taken while running the job (e.g., a sample portion of the job and/or the full job). Still other embodiments of the disclosure relate to estimating the startup power and/or minimum power required to run a job based on a fixed frequency at which the one or more nodes that will run the job will operate.

The HPC system may estimate the power that should be allocated to a job based on a predetermined frequency at which the nodes selected to run the job will operate. The estimate may be based on, at least, the job type (e.g., workload type), a list of nodes selected to run the job, and optionally a minimum power to be supplied to the selected nodes or a frequency at which the selected nodes will operate while running the job. The estimation may provide the HPC system with, at least, a power level for each frequency for each node (e.g., a platform maximum power (PMP), a workload maximum power and/or a workload average power), a thermal estimate that allows the HPC system to manage a cooling system and/or a performance estimate (e.g., performance metric) for one or more frequencies of the selected nodes which allows a user (e.g., the owner of the job) to adjust the job request based on the estimated performance metric (e.g., the time until completion), the estimated power level and the estimated total energy consumption of the job. A workload maximum power of a node may be defined as the maximum observed power sampled while the node was being calibrated (e.g., running a miniature application ("mini-app") and/or a portion of a job). The workload average power of a node may be defined as the average power of all of the power measurements sampled while the node was being calibrated. In at least some embodiments, to start a job a power needed for a job is estimated using one of power estimation techniques as described herein and using one of power calibration techniques as described in a related U.S. Publication No. 2016/005478 entitled "Methods and apparatus to generate and use power, thermal and performance characteristics of nodes to improve energy efficiency and reducing wait time for jobs in the queue."

The workload type may be used to determine the portion of calibration data used to generate an estimation as described above. For example, if the workload type (e.g., the type of job) is similar to a mini-app that has been used to calibrate the nodes of the HPC system, the estimator will retrieve the calibration data associated with the calibration of the nodes using the mini-app (e.g., stored in a calibration database).

Alternatively, the workload type may be a small portion of the actual job requested by a user. In such an example, the user may be have submitted a small portion (e.g., calculations totally, for example, 4-5 hours until completion) of the desired job for use in calibrating the one or more nodes that will process the job request. Therefore, the estimator will retrieve the calibration data of the one or more nodes that will process the job associated with the small portion of the desired job.

In yet another embodiment, sampling of various parameters of the nodes used to process a job (e.g., inter alia, temperature and/or power consumption) may be done during execution of the job. If the job is requested to be processed again (e.g., with slightly varying input parameters), the estimator may retrieve the calibration data associated with the job during its previous run-time and use that calibration data in generating the estimation.

Alternatively, or in addition, the HPC system may estimate the frequency at which a job should be run when the HPC system is aware of the power allocated for the job. The estimate may be based on, for example, the available power for the job (e.g., PMP, workload maximum power or workload average power), the job and the list of the selected nodes to run the job. The estimation may provide, for example, the frequency at which the selected nodes should operate, the expected thermal dissipation, the expected performance, and optionally, the power required for and the expected thermal dissipation of running the job at a higher frequency and/or a lower frequency.

In at least some embodiments, a job power, a system power, a job's completion and a job suspension status are monitored using one or more monitoring techniques, as described in a related U.S. Publication No. 2016/0054774 entitled "Profiling a job power and energy consumption for a data processing system."

Referring to FIG. 1, an exemplary block diagram of a HPC system receiving various inputs is shown. The HPC system 100 includes one or more operating system (OS) nodes 101 (also referred to as a head node), one or more compute nodes 102, one or more input/output (I/O) nodes 103 and a storage 104. A high-speed fabric communicatively connects the OS node 101, the compute nodes 102 and the I/O nodes 103. The high-speed fabric may be a network topology of nodes interconnected via one or more switches. In one embodiment, as illustrated in FIG. 1, the I/O nodes 103 are communicatively connected to the storage 104. The storage 104 may be non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The OS node 101 may provide a gateway to accessing the compute nodes 102. For example, prior to submitting a job for processing on the compute nodes 102, a user may be required to log-in to the HPC system 100 which may be through the OS node 101. In embodiments of the disclosure, the OS node 101 may accept jobs submitted by users and assist in the launching and managing of jobs being processed by the compute nodes 102. In one embodiment, the OS node 101 comprises a power monitor (not shown); a power estimator (not shown) described herein; and a power calibrator (not shown).

In one embodiment, the compute nodes 102 provide the bulk of the processing and computational power. The I/O nodes 103 may provide an interface between the compute nodes 102 and external devices (e.g., separate computers) that may provide input to the HPC system 100 or receive output from the HPC system 100.

The system power allocation ($P_{sys}$) may be provided to the HPC system 100 by, for example, a utility management facility (e.g., as determined by a system administrator or management software such as a data center manager). Typically, the $P_{sys}$ will be a limited amount of power allocated to the HPC system 100 with which the HPC system 100 will use to run one or more of the jobs 120. The jobs 120 comprise one or more jobs requested to be run by the HPC system 100 by one or more users. Each job includes a "power policy," which will be discussed in-depth below. The power policy will assist the HPC system 100 in allocating power for the job and aid in the management of the one or more jobs 120 being run by the HPC system 100.

In addition, the administrative policies 130 will guide the management of running the jobs 120 by providing an over-arching policy that defines the operation of the HPC system 100. Examples of policies that may be included in the administrative policies 130 include, but are not limited or restricted to, (1) maximize utilization of all hardware and software resources (e.g., instead of running fewer jobs at high power and leaving resources unused, run as many jobs as possible to use as much of the resources as possible); (2) a job with no power limit is given the highest priority among all running jobs; and/or (3) suspended jobs are at higher priority for resumption. Such administrative policies govern the way the HPC system 100 may schedule, launch, suspend and re-launch one or more jobs.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "power monitoring" should be interpreted as dynamically measuring power consumption by one or more of the components comprising the HPC system. The measurements taken may be used to calculate power consumption by, for example, an individual job and/or a group of jobs, as well as to provide statistics on the overall power consumption of the HPC system.

The term "power policy" should be interpreted as an input (e.g., one or more parameters) provided to the HPC system that provide guidance on allocation and management of power for a given job. The input may be provided as part of a job request submission and/or may be provided as a separate input (e.g., via a user interface screen or a configuration file). For example, the input may indicate, among other things, (i) whether a job may be subjected to a power limit, (ii) the maximum and/or minimum power at which a job may run and/or (iii) a minimum and/or maximum frequency at which the one or more nodes processing the job may operate.

The term "node" should be construed as one or more processors optionally grouped with, at least, a system memory and/or one or more input/output (I/O) components. The one or more processors, the system memory and the one or more I/O components may be referred to as the "components" of a node throughout the specification and claims. Throughout the specification and claims, the terms "processor," "computer processing unit (CPU)," and "core" will be used interchangeably.

The term "job" should be interpreted as predetermined calculations performed on the HPC system. For example, a user (e.g., owner of the job) may request that a job be run by the HPC which means the user is requesting to have one or more compute nodes performing calculations according to input parameters and/or data provided by the user. The job request may specify the one or more calculations (e.g., an application) that are to be used for the processing of the job.

The term "system power ($P_{sys}$)" should be interpreted as the amount of power provided to the HPC system by, for example, a facility or data center manager. The $P_{sys}$ is the total amount of power the HPC system has to allocate to one or more jobs at any given time.

The term "guard band" should be interpreted as a mechanism to assist in the management of a power budget of a HPC system. In one embodiment, the guard band may be an extra power allocation, which may be a predetermined percentage of the power allocated to the job. For example, if a HPC system has 3 MW of power to allocate to a job, the HPC system may only allocate 2.8 MW and maintain 0.2 MW as the guard band to prevent a spike in calculations to cause the power consumption of the job to exceed 3 MW. One purpose of the guard band is to maintain consistent power consumption by a job.

The term "platform max power (PMP)" should be interpreted as the power level measured for a node when the node is running a "power-virus." The power-virus is a workload, which may be an artificial workload created solely for calibration, that attempts to run each component of the node as much as possible while the power-virus is being run. Therefore, the PMP is highest possible level of power a node may consume.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for power management of a distributed computer system, such as a High Performance Computing (HPC) system. In particular, embodiments of the disclosure relate to managing power allocation to one or more jobs run in a HPC system based on estimates of the power consumption for each job as a result of calibration of the nodes within the HPC system. As this invention is susceptible to embodiments of many different forms, it is intended that the present disclosure is to be considered as an example of the principles of the invention and not intended to limit the invention to the specific embodiments shown and described.

II. Power Aware Distributed Computer System

Figure 2:
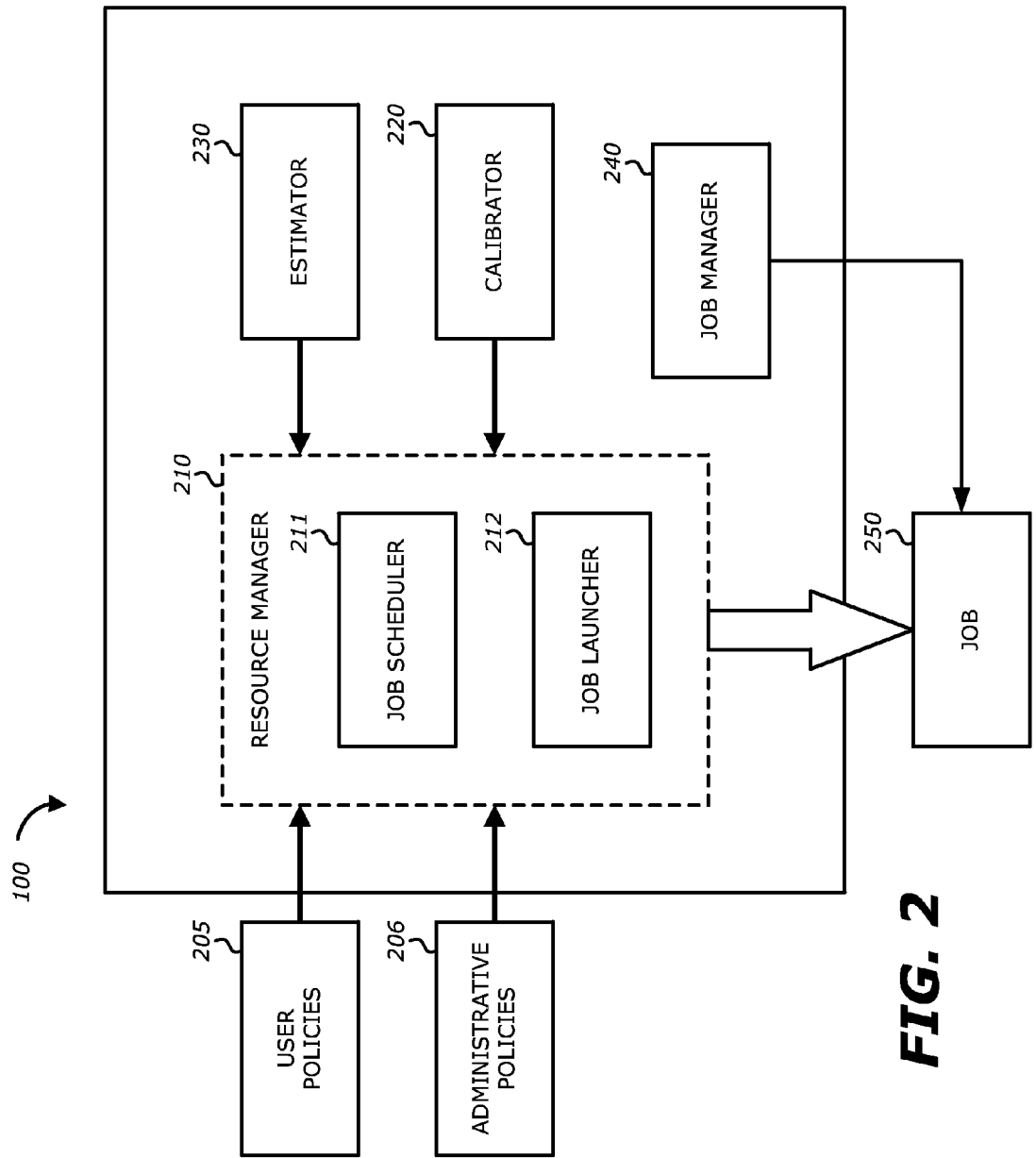
FIG. 2 is an exemplary block diagram of logic comprising the HPC system 100.

Referring to FIG. 2, an exemplary block diagram of logic comprising the HPC system 100 is shown. The logic of the HPC system 100 illustrated in FIG. 2 provides the bulk of the power management for the HPC system 100 and includes a resource manager 210 including a power aware job scheduler 211 and a power aware job launcher 212, a calibrator 220, an estimator 230, one or more job managers 240 (each job will have its own job manager), a job 250, the user policies 205 and the administrative policies 130. In one embodiment, the resource manager 210 and job manager 240 are configured to collect job power data.

The calibrator 220 calibrates the power, thermal dissipation and performance of each node within the HPC system 100. The calibrator 220 may provide a plurality of methods for calibrating the nodes within the HPC system 100. In one embodiment, the calibrator 100 may provide a first method of calibration in which every node within the HPC system 100 runs a sample workload (e.g., a mini-application, a portion of an application and/or a test script) so the calibrator 220 may sample various parameters (e.g., power consumed) at predetermined time intervals in order to determine, inter alia, (1) the average power, (2) the maximum power, and (3) the minimum power for each node. In addition, the sample workload may be run on each node at every operating frequency of the node. In another embodiment, the calibrator 220 may provide a second method of calibration in which calibration of one or more nodes occurs during the run-time of a job. In such a situation, the calibrator 220 may sample the one or more nodes on which a job is running (e.g., processing). In the second method, the calibrator 220 obtains power measurements of each node during actual run-time.

The estimator 230 provides the resource manager 210 with estimates of power consumption for each job enabling the resource manager 210 to efficiently schedule and monitor each job requested by one or more job owners (e.g., users). The estimator 220 may provide a power consumption estimate based on, for example, maximum and average power values stored in a calibration database, wherein the calibration database is populated by the processing of the calibrator 220. In addition, the minimum power required for each job may be considered. Other factors that may be used by the estimator 230 to create a power consumption estimate include, but are not limited or restricted to, whether the owner of the job permits the job to be subject to a power limit, the job power policy limiting the power supplied to the job (e.g., a predetermined fixed frequency at which the job will run, a minimum power required for the job, or varying frequencies and/or power supplied determined by the resource manager 210), the startup power for the job, the frequency at which the job will run, the available power to the HPC system 100 and/or the allocated power to the HPC system 100.

The each job requested by a user (e.g., the owner of the job) is accompanied by a user policy 205 (also illustrated in FIG. 1). The user policy includes at least a decision on whether the job 250 may be subjected to a power limit, if a power limit is permitted by the policy to limit the power (e.g., fixed frequency, minimum power required, or varying frequency and/or power determined by the resource manager 210), and whether the job 250 may be suspended. The user policy will be discussed in-depth below with FIG. 3.

In one embodiment, a power aware job scheduler 211 is configured to receive a selection of a mode for a job (e.g., included within the user policies 205), to determine an available power for the job based on the mode and to allocate a power for the job based on the available power. In one embodiment, the power aware job scheduler 211 is configured to determine a uniform frequency for the job based on the available power. In one embodiment, the power aware job scheduler 211 is configured to determine the available power for the job based on at least one of a monitored power, an estimated power, and a calibrated power. The power aware job scheduler 211 and resource manager 210 are configured to receive information regarding power consumption, to distribute the power budget to each job, and to implement a uniform frequency mechanism to limit power, as described in further detail below.

The resource manager 210 uses power aware job scheduler 211 and power aware job launcher 212 to schedule and launch a job based on the received power inputs, e.g., the user policies 205 and the administrative policies 206. In one embodiment, the resource manager 210 is a software object that is responsible for allocation of compute and I/O resources for interactive and batch jobs that one or more users want to run. Typically, the resource manager 210 is also responsible for scheduling the jobs out of the job queue and launching the jobs to run as scheduled. A job manager 240 is configured to control a job to stay within an allocated power budget for the job, as described in further detail below. In one embodiment, the job manager 240 is responsible for operating a job within the constraints of one or more power policies after the job has been launched. In one embodiment, the job manager 240 is used to control power performance of all components (e.g., nodes, or other components) involved in execution of a job as per policies specified by at least one of the user and/or administrator. The power aware job scheduler 211 and job manager 240 are described in the U.S. Publication No.2016/0054780 entitled "Power aware job scheduler and manager for a data processing system."

A. Exemplary Power Policy Selection User Interface

Figure 3:
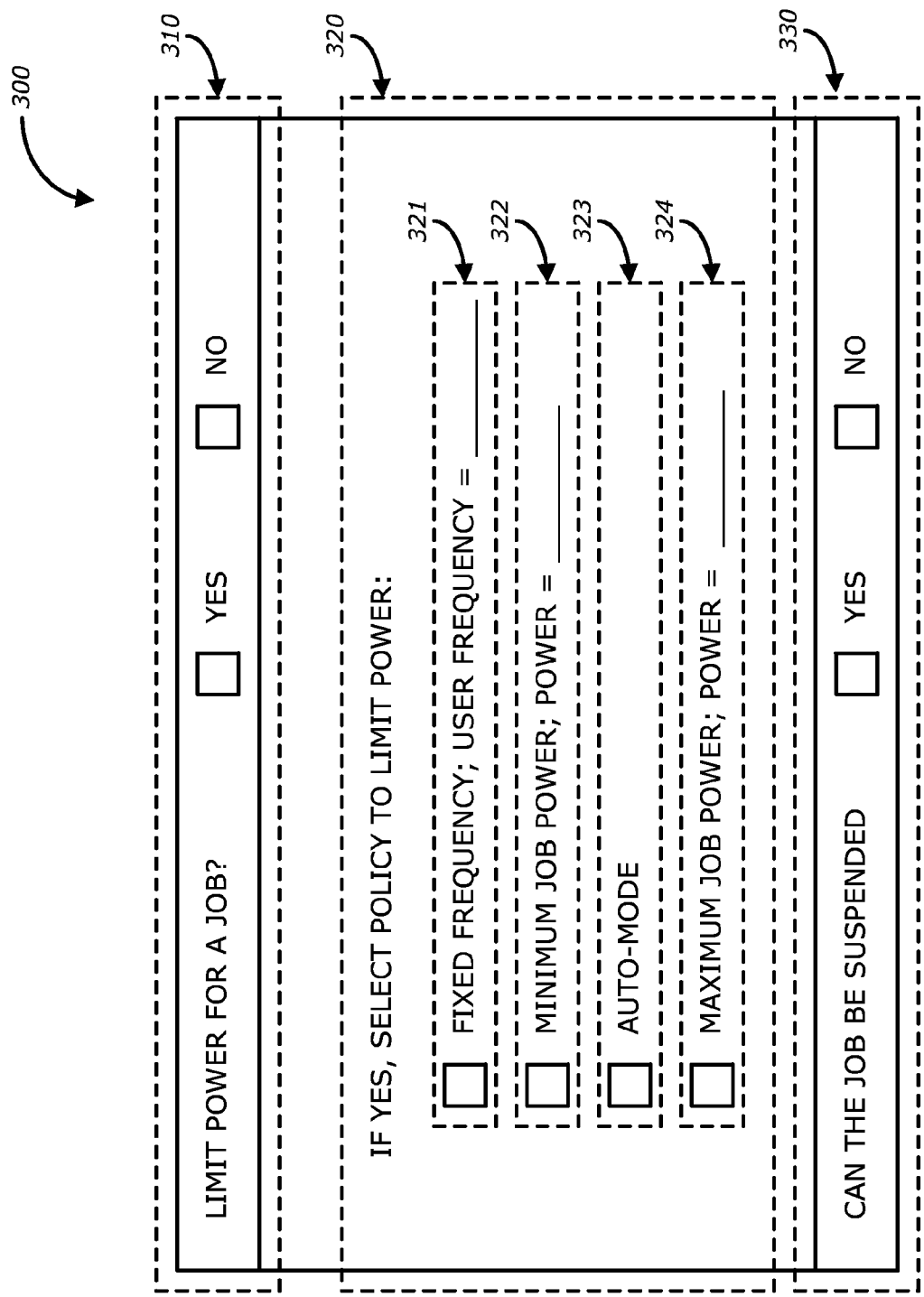
FIG. 3 is an exemplary embodiment of a user interface screen for designating a user policy while requesting a job be processed using the HPC system 100.

Referring to FIG. 3, an exemplary embodiment of a user interface screen for designating a user policy while requesting a job be processed using the HPC system 100 is shown. The user interface screen 300 includes the display area 310, 320 and 330. The display area 310 allows a user to designate whether the job, e.g., the job 250, is permitted to be subjected to a power limit (e.g., selecting "NO" results in the power-limiting policy 310, "No Power Limit," as seen in FIGS. 4A and 4B below).

The display area 320 pertains to the selection of one of a predetermined power-limiting policy when the user permits the job to be subjected to power-limiting. In the embodiment shown in FIG. 3, the display area 320 provides four additional predetermined power-limiting policies 321-323. The power-limiting policy 321 is a fixed frequency policy ("Fixed-Frequency") in which the user designates a particular frequency at which the one or more nodes on which the job will run should operate. The power-limiting policy 322 is a minimum job power policy ("Minimum Job Power") in which the user designates a minimum power to be supplied to the one or more nodes on which the job 250 will run. The power-limiting policy 323 is an automatic mode ("Auto-mode") in which the resource manager 210 may varying the frequency at which the one or more nodes operate and/or the power supplied to the one or more nodes on which the job 250 is running. The power-limiting policy 324 is a maximum job power policy ("Maximum Job Power") in which the user designates a maximum power to be supplied to the one or more nodes on which the job 250 will run. The display area 330 pertains to the selection of whether the job 250 may be suspended during processing.

A user interface screen is not the only method for a user to provide the HPC system 100 with input parameters such as, for example, a power policy, a minimum required frequency, a minimum required power and/or whether the job may be suspended. Alternatively, such parameters may be provided to the HPC system 100 as part of the job submission and/or as a configuration file (e.g., text file). In yet another embodiment, such parameters may be set by a system administrator, a facility manager/administrator and/or predetermined as part of a user's account with the HPC system 100.

B. Exemplary Parameters for Generating Power and Frequency Estimations

Referring to FIG. 4A, a table illustrating exemplary parameters used in determining resources necessary to run a job when power monitoring is not implemented is shown. The table 401 includes the column 421 that includes the parameters provided in an estimate to run a job and a first row 430 that sets forth the various power policies a user may select. The first power policy, "No Power Limit," is set forth in the column 422. A second power policy, "Fixed-Frequency," is set forth in the column 423. A third power policy, "Minimum Power," is set forth in the column 424, a fourth power policy, "Auto-mode," is set forth in the column 425 and a fifth power policy, "Maximum Power," is set forth in the column 426.

According to one embodiment, the estimator 230 does not have knowledge as to the power policy selected by the user. For example, the resource manager 210 (e.g., the job scheduler 211 and/or the job launcher 212) may provide the estimator 230 with a request for an estimation of the startup power required for a job and specifically request the PMP at a specified frequency (which would implicitly mean power monitoring is not implemented, as illustrated in FIG. 4A).

As is illustrated in the column 422, when a user selects the power policy of "No Power Limit," the resource manager 210 will request the following parameters from the estimator 230: the startup power required for a job as the PMP for the selected nodes; the maximum frequency at which the selected nodes should be run (e.g., all compute nodes 102 may have the same maximum frequency); the minimum power required to run the job as the PMP; and the power to be allocated for the job as the PMP. Therefore, the estimator 230 will consult a calibrator database to determine, and output, the PMP and the maximum frequency at which selected nodes may operate.

When a user selects the power policy of "Fixed-Frequency," the resource manager 210 will request the following parameters from the estimator 230, wherein the frequency selected by the user is represented by $F_s$: the startup power required for a job as the PMP at $F_s$ for the selected nodes; the frequency at which the selected nodes should be run as $F_s$; the minimum power required to run the job as either (i) zero when the job may be suspended, or (ii) PMP at $F_s$; and the power to be allocated for the job is the PMP at $F_s$. Therefore, the estimator 230 will consult a calibrator database to determine, and output, the PMP at $F_s$.

When a user selects the power policy of "Minimum Power," the resource manager 210 will request the following parameters from the estimator 230, wherein the minimum power established by the user is represented by $P_{min}$: the startup power required for a job as $P_{min}$ for the selected nodes; the frequency at which the selected nodes should be run as a first operational frequency, $F_{o\_1}$, the maximum frequency for which PMP is less than or equal to the available power and PMP at $F_{o\_1}$ is equal or greater than $P_{min}$. The minimum power required to run the job as either (i) zero when the job may be suspended, or (ii) the greater of PMP at $F_{min}$ and $P_{min}$; and the power to be allocated for the job as the greater of the minimum required power and the PMP at $F_{o\_1}$. Therefore, the estimator 230 will consult a calibrator database to determine, and output, $F_{o\_1}$, and, when the job cannot be suspended, the greater of PMP at $F_{min}$ and $P_{min}$.

When a user selects the power policy of "Auto-mode," the resource manager 210 will request the following parameters from the estimator 230: the startup power required for a job as the PMP at $F_{min}$, wherein $F_{min}$ represents the lowest frequency of the selected nodes; the frequency at which the selected nodes should be run as $F_{o\_1}$; the minimum power required to run the job as either (i) zero when the job may be suspended, or (ii) the PMP at $F_{min}$; and the power to be allocated for the job as the greater of the minimum required power and the PMP at $F_{o\_1}$. Therefore, the estimator 230 will consult a calibrator database to determine, and output, $F_{o\_1}$; the greater of the minimum required power and the PMP at $F_{min}$; and when the job cannot be suspended, the PMP at $F_{min}$.

When a user selects the power policy of "Maximum Power," the resource manager 210 will request the following parameters from the estimator 230, wherein the maximum power established by the user is represented by $P_{max}$: the startup power required for a job as PMP at $F_{min}$ when PMP at $F_{min}$ is less than $P_{max}$ for the selected nodes; the frequency at which the selected nodes should be run as a second operational frequency, $F_{o\_2}$, the maximum frequency for which PMP is less than or equal to the lesser of the available power and the maximum power; the minimum power required to run the job as either (i) zero when the job may be suspended, or (ii) PMP at $F_{min}$; and the power to be allocated for the job as the lesser of the $P_{max}$ and the PMP at $F_{o\_2}$. Therefore, the estimator 230 will consult a calibrator database to determine, and output, PMP at $F_{min}$ when PMP at $F_{min}$ is less than $P_{max}$ for the selected nodes; $F_{o\_2}$; PMP at $F_{min}$ when the job cannot be suspended; and the lesser of the $P_{max}$ and the PMP at $F_{o\_2}$.

Referring to FIG. 4B, a table illustrating exemplary parameters used in determining resources necessary to run a job when power monitoring is implemented is shown. The table 402 includes the column 441 that includes the parameters provided in an estimate to run a job and a first row 450 that sets forth the various power policies a user may select. The first power policy, "No Power Limit," is set forth in the column 442. The second power policy, "Fixed-Frequency," is set forth in the column 443. The third power policy, "Minimum Power," is set forth in the column 444, the fourth power policy, "Auto-mode," is set forth in the column 445 and a fifth power policy, "Maximum Power," is set forth in the column 446.

When power monitoring is implemented, the HPC system 100 (in particular, the job manager 240) is constantly aware of the power being consumed by the job 250 as the power being consumed is being dynamically measured. In contrast, when power monitoring is not implemented, the HPC system 100 determines the available power based on the $P_{sys}$ and the power allocated to the job 250, which is a static value.

As is illustrated in the column 442, when a user selects the power policy of "No Power Limit," the resource manager 210 will request the following parameters from the estimator 230: the startup power required for a job as the workload maximum power plus a guard band for the selected nodes; the frequency at which the selected nodes should be run as the maximum frequency of the nodes; the minimum power required to run the job as the workload maximum power plus the guard band; and the power to be allocated for the job as the workload maximum power plus the guard band. Therefore, the estimator 230 will consult a calibrator database to determine, and output, workload maximum power plus a guard band for the selected nodes; and the maximum frequency of the selected nodes.

When a user selects the power policy of "Fixed-Frequency," the resource manager 210 will request the following parameters from the estimator 230: the startup power required for a job as the workload maximum at $F_s$ for the selected nodes; the frequency at which the selected nodes should be run as $F_s$; the minimum power required to run the job as either (i) zero when the job may be suspended, or (ii) the workload maximum at $F_s$; and the power to be allocated for the job as the workload maximum power at $F_s$. Therefore, the estimator 230 will consult a calibrator database to determine, and output, the workload maximum at $F_s$ for the selected nodes; and the workload maximum at $F_s$ when the job cannot be suspended.

When a user selects the power policy of "Minimum Power," the resource manager 210 will request the following parameters from the estimator 230: the startup power required for a job as $P_{min}$ for the selected nodes; the frequency at which the selected nodes should be run as a third operational frequency, $F_{o\_3}$, the maximum frequency where the workload average power is less than or equal to the available power and workload average power at $F_{o\_3}$ is greater than $P_{min}$. The minimum power required to run the job as either (i) zero when the job may be suspended, or (ii) greater of the workload maximum power at $F_{min}$ and $P_{min}$; and the power to be allocated for the job as the greater of the minimum required power and the workload average at $F_{o\_3}$. Therefore, the estimator 230 will consult a calibrator database to determine, and output, $F_{o\_3}$; greater of the workload maximum power at $F_{min}$ and $P_{min}$ when the job cannot be suspended; and greater of the minimum required power and the workload average at $F_{o\_3}$.

When a user selects the power policy of "Auto-mode," the resource manager 210 will request the following parameters from the estimator 230: the startup power required for a job as the workload average at $F_{min}$; the frequency at which the selected nodes should be run as $F_{o\_3}$; the minimum power required to run the job as either (i) zero when the job may be suspended, or (ii) the workload maximum power at $F_{min}$; and the power to be allocated for the job as the greater of the minimum required power and the workload average at $F_{o\_3}$. Therefore, the estimator 230 will consult a calibrator database to determine, and output, workload average at $F_{min}$ for the selected nodes; $F_{o\_3}$; the workload maximum power at $F_{min}$ when the job cannot be suspended; and the greater of the minimum required power and the workload average at $F_{o\_3}$.

When a user selects the power policy of "Maximum Power," the estimator 230 will provide the resource manager 210 with the following parameters: the startup power required for a job is the workload average at $F_{min}$ when the workload average at $F_{min}$ is less than $P_{max}$ for the selected nodes, or else $p_{max}$; the selected nodes should be run at a fourth operational frequency, $F_{o\_4}$, the maximum frequency for which the workload maximum power is less than or equal to the lesser of the available power and the maximum power $p_{max}$; the minimum power required to run the job is either (i) zero when the job may be suspended, or (ii) workload maximum power at $F_{min}$; and the power to be allocated for the job is the lesser of the workload maximum power at $F_{o\_4}$ and $P_{max}$. Therefore, the estimator 230 will consult a calibrator database to determine, and output, workload average at $F_{min}$ when the workload average at $F_{min}$ is less than $P_{max}$ for the selected nodes; $F_{o\_4}$; workload maximum power at $F_{min}$ when the job cannot be suspended; and the lesser of the workload maximum power at $F_{o\_4}$ and $P_{max}$.

C. Exemplary Methodologies of Estimating Power Performance

Figure 5:
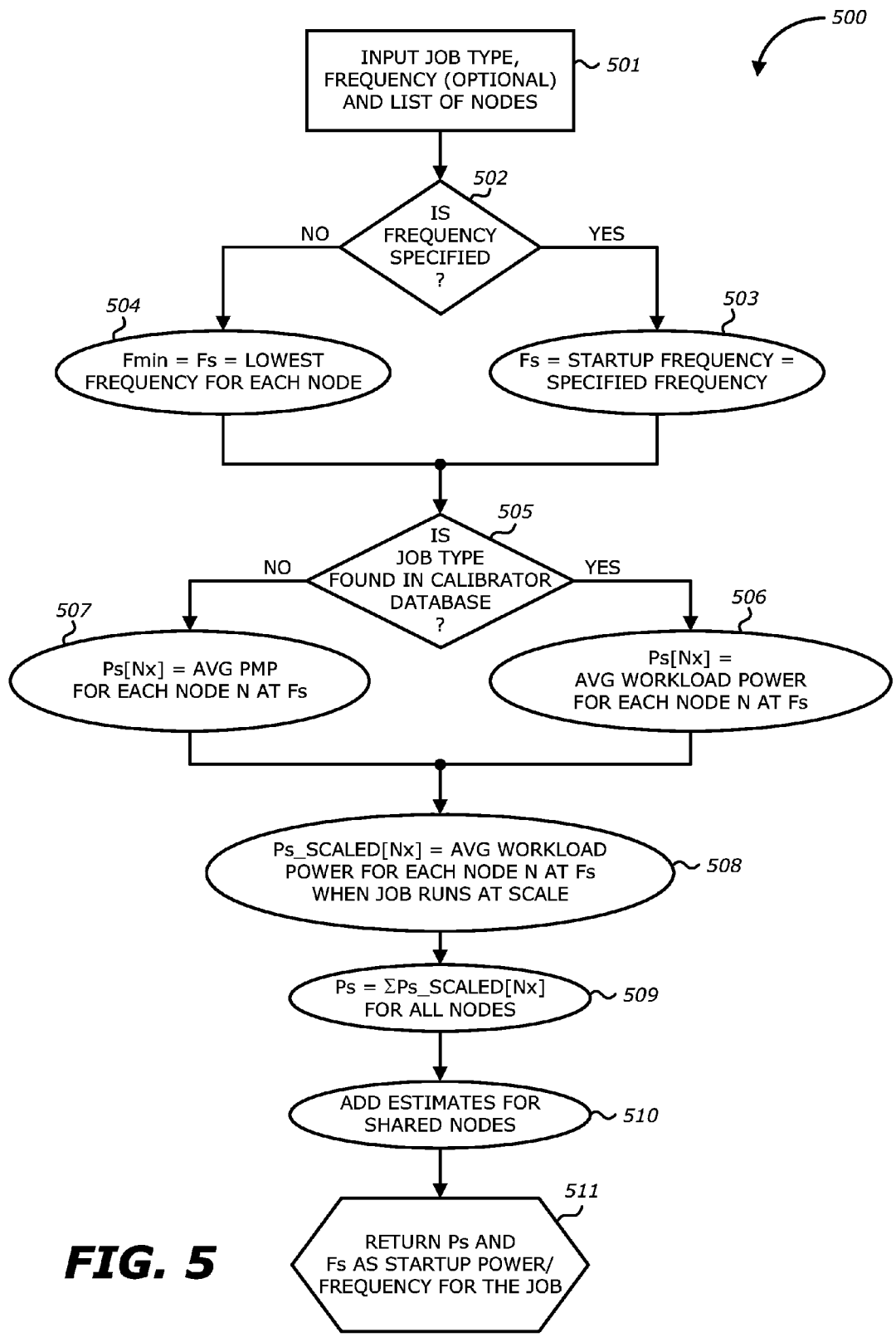
FIG. 5 is a flowchart illustrating an exemplary method for generating an estimate of the startup power.

Referring to FIG. 5, a flowchart illustrating an exemplary method for generating an estimate of the startup power is shown. Each block illustrated in FIG. 5 represents an operation performed in the method 500 of generating an estimation of the startup power for a job required to be available prior to launching the job. In operation 501, the estimator 230 receives, as input, a unique job identification (ID), a list of nodes on which the job is to run, and optionally, a specified frequency at which the nodes are to operate while running the job. When a specified frequency is provided (yes at operation 502), the startup frequency, $F_s$, is set as the specified frequency (operation 503). When no specified frequency is provided (no at operation 502), the minimum frequency, $F_{min}$, and the startup frequency, $F_s$, are set to the lowest frequency for each node within the list of selected nodes (operation 504).

In operation 505, the estimator 230 determines whether the job type corresponding to the unique job ID is present in the calibrator database (e.g., the nodes on the list of selected nodes have been calibrated with a workload satisfying a threshold of similarity with the job type of the unique job ID). When the job type is found in the calibrator database (yes at operation 505), the startup power for each node, $P_s[N_X]$, with $N_X$ representing one of the one or more one nodes on the selected list of nodes, is set to the average workload power for each node at $F_s$ obtained from the calibrator database (operation 506).

When the job type is not found in the calibrator database (no at operation 505), the startup power for each node, $P_s[N_X]$, is set to the average PMP for each node at $F_s$ obtained from the calibrator database (operation 507).

At operation 508, the $P_s[N_X]$ is set to the average workload power for each node N at $F_s$ when the job runs at scale ($P_{s\_}$scaled$[N_X]$). The terms "$P_{a\_}$scaled$[N_X]$" and "$P_{max\_}$scaled$[N_X]$" refer to the average and maximum node power, respectively, needed to run the job on compute node $N_x$ when the job is processed on a specified number of compute nodes (as one example, X may be equal to 10,000). The scaling takes into account the fact that the power consumed per node may vary when the job is scaled to run on the specified number of nodes due to reduced power consumption per compute node $N_x$ while the processes operating on each compute node $N_x$ are waiting for communication (e.g., among compute nodes and/or with the OS node 101). According to one embodiment, the wait time to communicate is longer for a larger number of compute nodes.

For example, calibration may be run on 100 nodes at one time for a mini-app whereas an actual job request may request the use of 10,000 nodes. In some situations, the average power consumption and maximum power consumption may be less per node when the job runs on 10,000 nodes as communication among 10,000 nodes takes more time than communication among 100 nodes and while the node waits for communication to take place, less power is consumed than when the node is processing calculations. Therefore, the estimator 230 may perform a scaling process on the calibration data to scale the measurements (e.g., maximum temperature, average temperature, maximum power, average power, etc.) based on the number of nodes used during calibration and the number of nodes to be used in the actual processing of the job.

At operation 509, the overall startup power for the job, $P_s$, is set to the sum of the $P_{s\_scaled}[N_X]$ for all nodes on the list of selected nodes. At operation 510, the estimates for shared nodes are added. A shared node is a node that performs processing for more than one job. An example of a shared node is an I/O node wherein the I/O node performs control of a storage device shared among multiple nodes and/or performs control over network interfacing (e.g., with a second HPC system and/or user devices). The estimate for shared nodes include an estimate of the power the one or more shared nodes will consume based on the functions the one or more shared nodes will perform. Similar calibration techniques may be used to determine the power consumption of the one or more shared nodes. In operation 511, the estimation of the $P_s$ and $F_s$ for the unique job ID is output to the resource manager 210.

Figure 6:
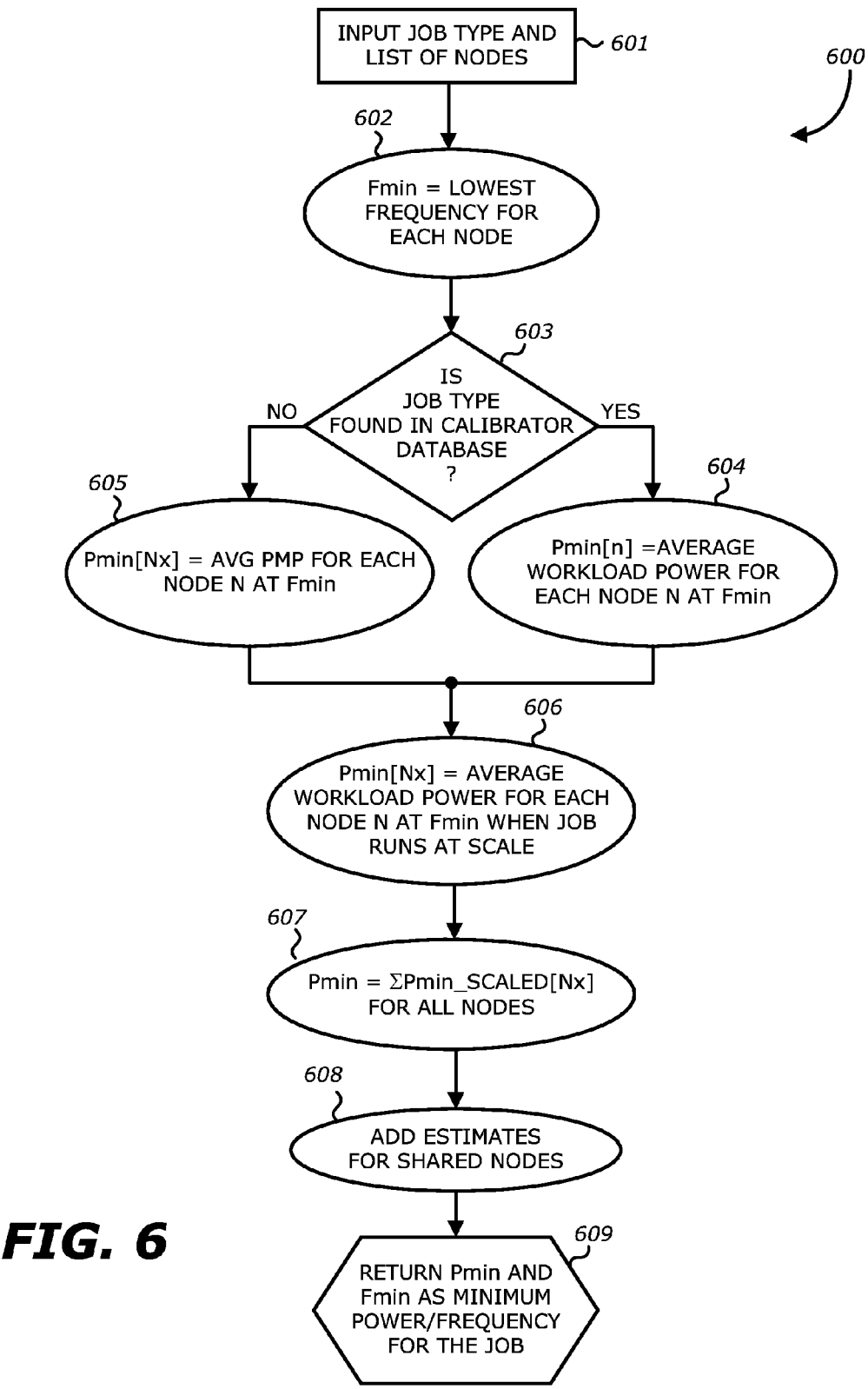
FIG. 6 is a flowchart illustrating an exemplary method for generating an estimate of the minimum required power for a job

Referring now to FIG. 6, a flowchart illustrating an exemplary method for generating an estimate of the minimum required power for a job is shown. Each block illustrated in FIG. 6 represents an operation performed in the method 600 of generating an estimation of the minimum power required to run a job (the minimum power required to run a job is typically less than or equal to the startup power as illustrated in FIG. 5). In operation 601, the estimator 230 receives, as input, at least, a unique job ID and a list of nodes on which the job is to run. At operation 602, $F_{min}[N]$ is set to the lowest frequency for each node.

In operation 603, the estimator 230 determines whether the job type corresponding to the unique job ID is present in the calibrator database. When the job type is found in the calibrator database (yes at operation 603), the minimum power for each node, $P_{min}[N_X]$, is set to the average workload power for each node at $F_{min}$ obtained from the calibrator database (operation 604). When the job type is not found in the calibrator database (no at operation 603), the minimum power for each node, $P_{min}[N_X]$, is set to the average PMP for each node at $F_{min}$ obtained from the calibrator database (operation 605).

At operation 606, the $P_{min}[N_X]$ is set to the average workload power for each node N at $F_{min}$ when the job runs at scale ($P_{min\_scaled}[N_X]$).

At operation 607, the overall minimum power for the job, $P_{min}$, is set to the sum of the $P_{min\_scaled}[N_X]$ for all nodes on the listed of selected nodes. At operation 608, the estimates for shared nodes are added. In operation 609, the estimation of the $P_{min}$ and $K_{min}$ for the unique job ID is output to the resource manager 210.

Figure 7:
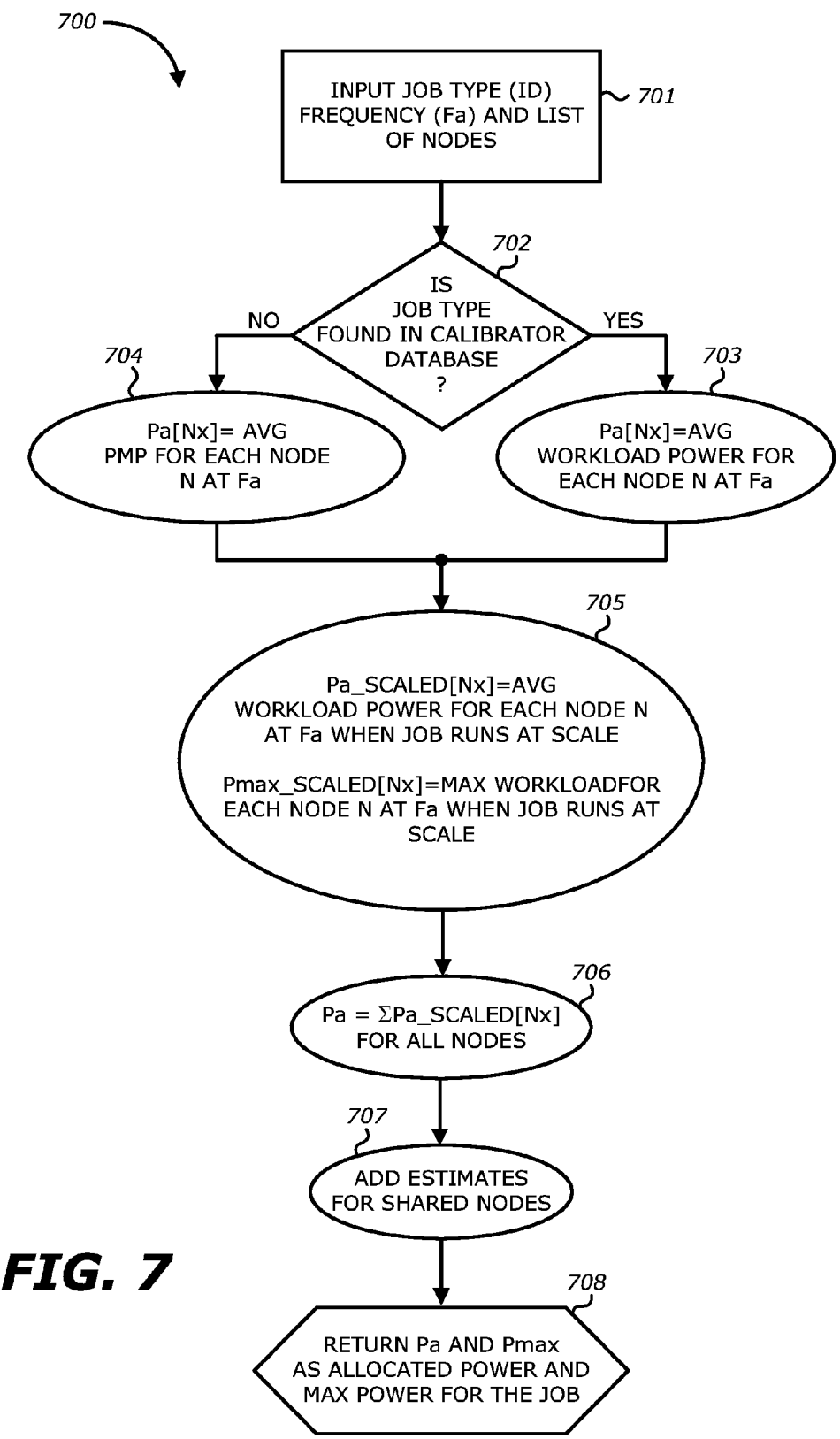
FIG. 7 is a flowchart illustrating an exemplary method for generating an estimate of the allocated power required for a job.

Referring now to FIG. 7, a flowchart illustrating an exemplary method for generating an estimate of the allocated power required for a job is shown. Each block illustrated in FIG. 7 represents an operation performed in the method 700 of generating an estimation of the allocated power required to run a job. In operation 701, the estimator 230 receives, as input, at least, a unique job identification (ID), a list of nodes on which the job is to run, and an allocated frequency, $F_a$, at which the nodes are to operate while running the job.

In operation 702, the estimator 230 determines whether the job type corresponding to the unique job ID is present in the calibrator database. When the job type is found in the calibrator database (yes at operation 702), the allocated power for each node, $P_a[N_X]$, is set to the average workload power for each node at $F_a$ obtained from the calibrator database (operation 703). When the job type is not found in the calibrator database (no at operation 702), the allocated power for each node, $P_a[N_X]$, is set to the average PMP for each node at $F_a$ obtained from the calibrator database (operation 704).

At operation 705, the $P_a[N_X]$ is set to the average workload power for each node N at $F_a$ when the job runs at scale ($P_{a\_scaled}[N_X]$) and the $P_{max}[N_X]$ is set to the maximum workload for each node N at $F_a$ when the job runs at scale.

At operation 706, the overall allocated power required for the job, $P_a$, is set to the sum of the $P_{a\_scaled}[N_X]$ for all nodes on the listed of selected nodes. At operation 707, the estimates for shared nodes are added.

In operation 708, the estimator 230 outputs $P_a$ and $P_{max}$ as the estimate for the allocated power and maximum power for the job, respectively.

Figure 8:
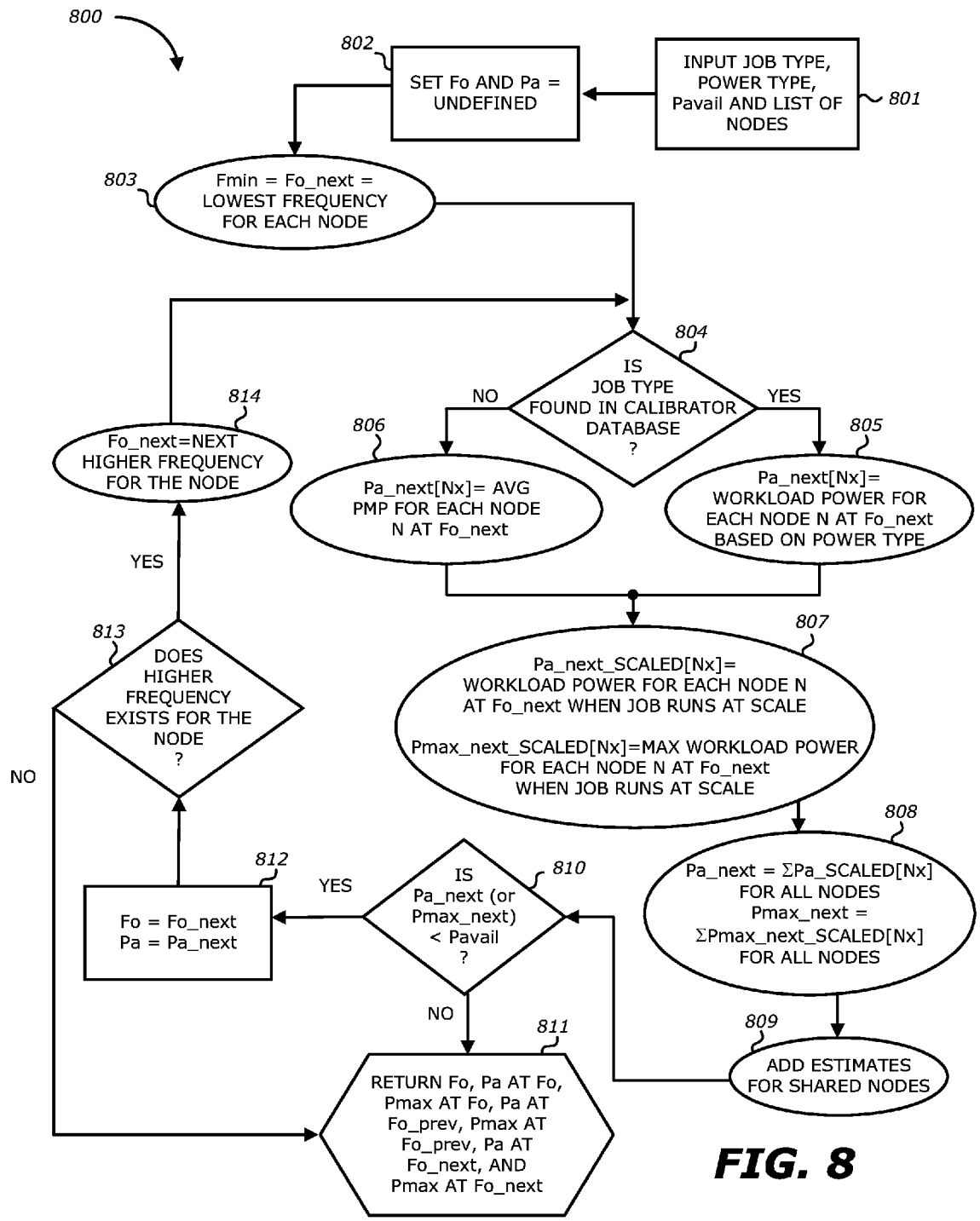
FIG. 8 a flowchart illustrating an exemplary method for generating an estimate of an operational frequency based on the available power for a job.

Referring to FIG. 8, a flowchart illustrating an exemplary method for generating an estimate of an operational frequency based on the available power for a job is shown. Each block illustrated in FIG. 8 represents an operation performed in the method 800 of generating an estimation of the operational frequency based on the available power to run a job. In operation 801, the estimator 230 receives, as input, at least, a job type, the power available for the job ($P_{avail}$), and a list of nodes on which the job is to run.

At operation 802, the operational frequency (Fo) and the allocated power ($P_a$) are set to an "undefined" value. The $F_o$, as output by the estimator 230 at operation 811, is the estimate of the frequency at which the nodes of the list of nodes provided to the estimator 230 should operate based on the $P_{avail}$. The $F_o$ that is output at operation 811 represents the highest frequency at which the nodes on the list of nodes may operate such that the nodes will not consume more power than $P_{avail}$. At operation 803, the variable, $F_{o\_next}$, is set to the lowest frequency for each node (e.g., as provided in the calibrator database).

For example, a user may submit a job, "Job_A," to be run in Auto-mode. When the job is ready to run the job launcher 212 determines there is, for example, 1.2 MW of power available to be allocated to Job_A. Subsequently, the resource manager 210 may request an estimate of, inter alia, the frequency at which the nodes should operate to run the job while consuming less than or equal to 1.2 MW of power from the estimator 230. The estimate, based on, at least, a job type and a list of nodes, provides the resource manager 210 with an output of a maximum frequency at which Job_A may run say while consuming less than or equal to 1.2 MW of power. The estimator 230 may also include in the estimate, an estimate of the average power and an estimate of the maximum power Job_A may consume while operating at 2.3 GHz.

At operation 804, the estimator 230 determines whether calibration data for a workload of the job type is present in the calibrator database. When calibration data for a workload of the job type is found in the calibrator database (yes at operation 804), the variable power for each node, $P_{a\_next}$

[$N_x$], is set to a workload power for each node at $F_{o\_next}$ obtained from the calibrator database (operation 805). The workload power is based on the power type parameter received as an input at operation 801. The power type may be, for example, PMP, average workload power or maximum workload power. The power type may be determined from user input (e.g., a power policy selection) and/or whether power monitoring is used (e.g., when power monitoring is not used, the power type may be PMP). When calibration data for a workload of the job type is not found in the calibrator database (no at operation 804), the variable power for each node, $P_{a\_next}$[$N_x$] is set to the average PMP for each node at $F_{o\_next}$ obtained from the calibrator database (operation 806).

At operation 807, the $P_{a\_next}$[$N_x$] is set to the workload power, as described regarding operation 804, for each node N at $F_{o\_next}$ when the job runs at scale ($P_{a\_next}$_scaled[$N_x$]) and the $P_{max\_next}$[$N_x$] is set to the maximum workload for each node N at $F_{o\_next}$ when the job runs at scale ($P_{max\_next}$_Scaled[$N_x$]). At operation 808, the variable representing overall power required for the job, $P_{a\_next}$, is set to the sum of the $P_{a\_next}$_scaled[$N_x$] for all nodes on the listed of selected nodes. At operation 809, the estimates for shared nodes are added.

At operation 810, the estimator 230 determines whether the variable power, $P_{a\_next}$, is less than the available power, $P_{avail}$, (or $P_{max\_next}$ is less than $P_{avail}$). When $P_{a\_next}$ is not less than $P_{avail}$ (no at operation 810), the estimator 230 outputs an estimate including (i) $F_o$ as the estimate for the operational frequency for the job, (ii) $P_a$ as the estimated workload power when the job operates at $F_o$, (iii) $P_{max}$ as the maximum workload power at $F_o$, (iv) $F_{o\_prev}$ as the operating frequency just lower than $F_o$ on the list of operating frequencies maintained in the calibration database, (v) $P_{a\_prev}$ as the estimated power at when the job operates $F_{o\_prev}$, (vi) $P_{max\_prev}$ as the maximum workload power at $F_{o\_prev}$, (vii) $F_{o\_next}$ as the operating frequency just higher than $F_o$ on the list of operating frequencies maintained in the calibration database, (viii) $P_{a\_next}$ as the estimated power when the job operates at $F_{o\_next}$, and (vii) $P_{max\_next}$ as the maximum workload power at $F_{o\_next}$ (operation 811). When the power at the lowest frequency for each node (see operation 803) is less the available power, operation 811 will return $F_a$ and $P_a$ as an "undefined" value. Based on $F_a$ and $P_a$ being set to "undefined," the HPC system 100 will determine that the job requested by the user cannot be run with the current available power at the power type desired.

When $P_a$ is less than $P_{avail}$ (yes at operation 810), the estimator 230 sets $F_o$ equal to $F_{o\_next}$ and $P_a$ equal to $P_{a\_next}$ (operation 812). At operation 813, the estimator 230 determines whether the nodes on the list of selected nodes may operate at a higher frequency than $F_{o\_next}$ (operation 813). When the nodes on the list of selected nodes cannot operate at a higher frequency than $F_{o\_next}$ (no at operation 813), the estimator 230 outputs an estimate including (i) $F_o$ as the estimate for the operational frequency for the job, (ii) $P_a$ as the estimated workload power when job operates at $F_o$, (iii) $P_{max}$ as the maximum workload power at $F_o$, (iv) $F_{o\_prev}$ as the operating frequency just lower than $F_o$ on the list of operating frequencies maintained in the calibration database, (v) $P_{a\_prev}$ as the estimated power when the job operates at $F_{o\_prev}$, (vi) $P_{max\_prev}$ as the maximum workload power at $F_{o\_prev}$, (vii) $F_{o\_next}$ as the operating frequency just higher than $F_o$ on the list of operating frequencies maintained in the calibration database, (viii) $P_{a\_next}$ as the estimated job power when the job operates at $F_{o\_next}$, and (vii) $P_{max\_next}$ as the maximum workload power at $F_{o\_next}$ (operation 811).

When the nodes on the list of selected nodes can operate at a higher frequency than $F_o$ (yes at operation 813), $F_{o\_next}$ is set to the next higher frequency as listed in the calibrator database (operation 814). When $F_{o\_next}$ is set to the next higher frequency as listed in the calibrator database (operation 814), the method 800 returns to operation 804 as discussed above.

The following examples pertain to further embodiments:

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a list of frequencies, responsive to receiving the plurality of workload parameters, retrieving, by the estimator module, calibration data from a calibration database, generating, by the estimator module, a power estimate based on the plurality of workload parameters and the calibration data and providing, by the estimator module, the power estimate to a resource manager.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a list of frequencies, responsive to receiving the plurality of workload parameters, retrieving, by the estimator module, calibration data from a calibration database, generating, by the estimator module, a power estimate based on the plurality of workload parameters and the calibration data and providing, by the estimator module, the power estimate to a resource manager, wherein the calibration data includes one or more of a maximum power, an average power, a maximum temperature, an average power, a performance metric, or a minimum required power.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a list of frequencies, responsive to receiving the plurality of workload parameters, retrieving, by the estimator module, calibration data from a calibration database, generating, by the estimator module, a power estimate based on the plurality of workload parameters and the calibration data and providing, by the estimator module, the power estimate to a resource manager, wherein the power estimate includes one or more of a maximum power consumed by each node on the list of selected nodes while running a workload of the workload type at each frequency of the list of frequencies, an average power consumed by each node on the list of selected nodes while running the workload at each frequency of the list of frequencies, a maximum temperature of each node on the list of selected nodes while running the workload at each frequency of the list of frequencies, an average power of each node on the list of selected nodes while running the workload at each frequency of the list of frequencies, a performance metric for the workload type while running the workload at each frequency of the list of frequencies, or a minimum required power for the nodes on the list of selected nodes to perform the workload at each frequency of the list of frequencies.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a list of frequencies, responsive to receiving the plurality of workload parameters, retrieving, by the estimator module, calibration data from a calibration database, generating, by the estimator module, a power estimate based on the plurality of workload parameters and the calibration data and providing, by the estimator module, the power estimate to a resource manager, wherein the workload type includes a type of one of a small application, a portion of an application or a test script, wherein the small application, the portion of an application and the test script are used in a calibration of the nodes on the list of selected nodes.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a list of frequencies, responsive to receiving the plurality of workload parameters, retrieving, by the estimator module, calibration data from a calibration database, generating, by the estimator module, a power estimate based on the plurality of workload parameters and the calibration data and providing, by the estimator module, the power estimate to a resource manager, wherein generating the power estimate includes scaling the calibration data, wherein the scaling adjusts the power consumed per node on the list of selected nodes when the distributed computer system performs a job of the workload type to consider a size of the list of selected nodes.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the calibration data includes one or more of a maximum power, an average power, a maximum temperature, an average power, or a performance metric.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the frequency estimate further includes the selected frequency and one or more of a maximum power consumed by each node on the list of selected nodes while running a workload of the workload type at the selected frequency, an average power consumed by each node on the list of selected nodes while running the workload at the selected frequency, a maximum temperature of each node on the list of selected nodes while running the workload at the selected frequency, an average power of each node on the list of selected nodes while running the workload at the selected frequency, a performance metric for the workload type while running the workload at the selected frequency, or a minimum required power for the nodes on the list of selected nodes to perform the workload at the selected frequency.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the frequency estimate further includes the selected frequency and one or more of a maximum power consumed by each node on the list of selected nodes while running a workload of the workload type at the selected frequency, an average power consumed by each node on the list of selected nodes while running the workload at the selected frequency, a maximum temperature of each node on the list of selected nodes while running the workload at the selected frequency, an average power of each node on the list of selected nodes while running the workload at the selected frequency, a performance metric for the workload type while running the workload at the selected frequency, or a minimum required power for the nodes on the list of selected nodes to perform the workload at the selected frequency, wherein the selected frequency is a highest frequency at which the nodes on the list of selected nodes may operate such that a total power consumed by the nodes on the list of selected nodes does not exceed the available power while running the workload.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the frequency estimate further includes the selected frequency and one or more of a maximum power consumed by each node on the list of selected nodes while running a workload of the workload type at the selected frequency, an average power consumed by each node on the list of selected nodes while running the workload at the selected frequency, a maximum temperature of each node on the list of selected nodes while running the workload at the selected frequency, an average power of each node on the list of selected nodes while running the workload at the selected frequency, a performance metric for the workload type while running the workload at the selected frequency, or a minimum required power for the nodes on the list of selected nodes to perform the workload at the selected frequency, wherein the frequency estimate further includes an average power consumed by each node on the list of selected nodes while running the workload at a second frequency, a maximum power consumed by each node on the list of selected nodes while running the workload at the second frequency, an average power consumed by each node on the list of selected nodes while running the workload at a third frequency, and a maximum power consumed by each node on the list of selected nodes while running the workload at the third frequency, wherein the second frequency is a next higher frequency than the selected frequency at which the nodes on the list of selected nodes were calibrated and the third frequency is a next lower frequency at which the nodes on the list of selected nodes were calibrated.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the workload type includes a type of one of a small application, a portion of an application or a test script, wherein the small application, the portion of an application and the test script are used in a calibration of the nodes on the list of selected nodes.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the input parameters further include an option for a selected frequency as one of a frequency resulting in a fastest performance metric or a frequency resulting in a most energy efficient metric.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the input parameters further include an option for a selected frequency as one of a frequency resulting in a fastest performance metric or a frequency resulting in a most energy efficient metric, wherein the frequency resulting in the fastest performance metric is a frequency at which the nodes on the list of selected nodes operate to complete a workload of the workload type in a fastest time.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the input parameters further include an option for a selected frequency as one of a frequency resulting in a fastest performance metric or a frequency resulting in a most energy efficient metric, wherein the frequency resulting in the most energy efficient metric is a frequency at which the nodes on the list of selected nodes operate to complete a workload of the workload type with a lowest aggregate power consumption among the nodes on the list of selected nodes.

A non-transitory computer readable storage medium having stored thereon instructions, the instructions being executable by one or more processors to perform operations including receiving, by an estimator module executed by the one or more processors, a plurality of input parameters, the plurality of input parameters including (i) a workload type, (ii) a list of selected nodes belonging to a distributed computer system, and (iii) a power value available to the distributed computer system, responsive to receiving the plurality of workload parameters, retrieving, by the estimator module, calibration data from a calibration database, generating, by the estimator module, a frequency estimate based on the plurality of workload parameters and the calibration data and providing, by the estimator module, the frequency estimate to a resource manager, wherein the frequency estimate includes a selected frequency at which the nodes should operate while processing a workload and a corresponding power the processing of the workload will consume at the frequency, wherein the frequency estimate further includes the selected frequency and one or more of a maximum power consumed by each node on the list of selected nodes while running a workload of the workload type at the selected frequency, an average power consumed by each node on the list of selected nodes while running the workload at the selected frequency, a maximum temperature of each node on the list of selected nodes while running the workload at the selected frequency, an average power of each node on the list of selected nodes while running the workload at the selected frequency, a performance metric for the workload type while running the workload at the selected frequency, or a minimum required power for the nodes on the list of selected nodes to perform the workload at the selected frequency, wherein generating the frequency estimate includes scaling the calibration data, wherein the scaling adjusts the power consumed per node on the list of selected nodes when the distributed computer system performs a job of the workload type to consider a size of the list of selected nodes.

A system generating a power estimate for a distributed computer system comprising one or more processors and a storage module communicatively coupled to the one or more processors, the storage module comprises an estimator module to receive a plurality of input parameters, the plurality of input parameters including (i) a workload type, and (ii) a list of selected nodes belonging to the distributed computer system, determine a lowest frequency for each node on the list of selected nodes, generate the power estimate by (i) determining an average power consumption for each node on the list of selected nodes at the lowest frequency and (ii) scaling the average power consumption for each node on the list of selected nodes and provide the power estimate to a resource manager, wherein the power estimate includes a minimum required power to start processing of a job of the workload type.

A system comprising one or more processors and a storage module communicatively coupled to the one or more processors, the storage module comprises an estimator module to receive a plurality of input parameters, the plurality of input parameters including (i) a workload type, and (ii) a list of selected nodes belonging to a distributed computer system, determine a lowest frequency for each node on the list of selected nodes, generate a power estimate by (i) determining an average power consumption for each node on the list of selected nodes at the lowest frequency and (ii) scaling the average power consumption for each node on the list of selected nodes and provide the power estimate to a resource manager, wherein the power estimate includes a minimum required power to start processing of a job of the workload type, wherein when the plurality of input parameters further includes a specified frequency, the lowest frequency is set to the specified frequency.

A system comprising one or more processors and a storage module communicatively coupled to the one or more processors, the storage module comprises an estimator module to receive a plurality of input parameters, the plurality of input parameters including (i) a workload type, and (ii) a list of selected nodes belonging to a distributed computer system, determine a lowest frequency for each node on the list of selected nodes, generate a power estimate by (i) determining an average power consumption for each node on the list of selected nodes at the lowest frequency and (ii) scaling the average power consumption for each node on the list of selected nodes and provide the power estimate to a resource manager, wherein the power estimate includes a minimum required power to start processing of a job of the workload type, wherein when the plurality of input parameters does not include a specified frequency, the lowest frequency is set to a lowest frequency for each node on the list of selected nodes that is associated with calibration data stored within a calibration database of the distributed computer system.

A system comprising one or more processors and a storage module communicatively coupled to the one or more processors, the storage module comprises an estimator module to receive a plurality of input parameters, the plurality of input parameters including (i) a workload type, and (ii) a list of selected nodes belonging to a distributed computer system, determine a lowest frequency for each node on the list of selected nodes, generate a power estimate by (i) determining an average power consumption for each node on the list of selected nodes at the lowest frequency and (ii) scaling the average power consumption for each node on the list of selected nodes and provide the power estimate to a resource manager, wherein the power estimate includes a minimum required power to start processing of a job of the workload type, wherein when data associated with calibration of the nodes on the selected list of nodes for the workload type is determined to be present in a calibration database included in the distributed computer system, (i) an average workload power is determined for each node on the selected list of nodes based on calibration data associated with the workload type stored in the calibration database, and (ii) the average workload power for each node on the selected list of nodes is scaled and summated, wherein the summation is provided in the power estimate as a startup power.

A system comprising one or more processors and a storage module communicatively coupled to the one or more processors, the storage module comprises an estimator module to receive a plurality of input parameters, the plurality of input parameters including (i) a workload type, and (ii) a list of selected nodes belonging to a distributed computer system, determine a lowest frequency for each node on the list of selected nodes, generate a power estimate by (i) determining an average power consumption for each node on the list of selected nodes at the lowest frequency and (ii) scaling the average power consumption for each node on the list of selected nodes and provide the power estimate to a resource manager, wherein the power estimate includes a minimum required power to start processing of a job of the workload type, wherein when data associated with calibration of the nodes on the selected list of nodes for the workload type is determined to not be present in a calibration database included in the distributed computer system, (i) an average maximum power is determined for each node on the selected list of nodes based on calibration data associated with a power-virus stored in the calibration database, and (ii) the average maximum power for each node on the selected list of nodes is scaled and summated, wherein the summation is provided in the power estimate as a startup power.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon instructions, the instructions being executable by one or more processors to perform operations including:
    receiving, by an estimator module executed by the one or more processors, a plurality of input parameters, the plurality of input parameters including (i) a workload type, (ii) a list of selected nodes belonging to a distributed computer system, and (iii) a list of frequencies;
    responsive to receiving the plurality of workload parameters, retrieving, by the estimator module, calibration data from a calibration database;
    generating, by the estimator module, a power estimate based on the plurality of workload parameters and the calibration data, wherein generating the power estimate includes scaling the calibration data to adjust the power consumed per node on the list of selected nodes when the distributed computer system performs a job of the workload type to consider a size of the list of selected nodes; and
    providing, by the estimator module, the power estimate to a resource manager.

2. The non-transitory computer readable storage medium of claim 1, wherein the calibration data includes one or more of a maximum power, an average power, a maximum temperature, an average power, a performance metric, or a minimum required power.

3. The non-transitory computer readable storage medium of claim 1, wherein the power estimate includes one or more of a maximum power consumed by each node on the list of selected nodes while running a workload of the workload type at each frequency of the list of frequencies, an average power consumed by each node on the list of selected nodes while running the workload at each frequency of the list of frequencies, a maximum temperature of each node on the list of selected nodes while running the workload at each frequency of the list of frequencies, an average power of each node on the list of selected nodes while running the workload at each frequency of the list of frequencies, a performance metric for the workload type while running the workload at each frequency of the list of frequencies, or a minimum required power for the nodes on the list of selected nodes to perform the workload at each frequency of the list of frequencies.

4. The non-transitory computer readable storage medium of claim 1, wherein the workload type includes a type of one of a small application, a portion of an application or a test script, wherein the small application, the portion of an application and the test script are used in a calibration of the nodes on the list of selected nodes.

5. A non-transitory computer readable storage medium having stored thereon instructions, the instructions being executable by one or more processors to perform operations including:
    receiving, by an estimator module executed by the one or more processors, a plurality of input parameters, the plurality of input parameters including (i) a workload type, (ii) a list of selected nodes belonging to a distributed computer system, and (iii) a power value available to the distributed computer system;
    responsive to receiving the plurality of workload parameters, retrieving, by the estimator module, calibration data from a calibration database;
    generating, by the estimator module, a frequency estimate based on the plurality of workload parameters and the calibration data, wherein the generating the power estimate includes scaling the calibration data to adjust the power consumed per node on the list of selected nodes when the distributed computer system performs a job of the workload type to consider a size of the list of selected nodes; and
    providing, by the estimator module, the frequency estimate to a resource manager, wherein the frequency estimate includes a selected frequency at which the nodes should operate while processing a workload and a corresponding power the processing of the workload will consume at the frequency.

6. The non-transitory computer readable storage medium of claim 5, wherein the calibration data includes one or more of a maximum power, an average power, a maximum temperature, an average power, or a performance metric.

7. The non-transitory computer readable storage medium of claim 5, wherein the frequency estimate further includes the selected frequency and one or more of a maximum power consumed by each node on the list of selected nodes while running a workload of the workload type at the selected frequency, an average power consumed by each node on the list of selected nodes while running the workload at the selected frequency, a maximum temperature of each node on the list of selected nodes while running the workload at the selected frequency, an average power of each node on the list of selected nodes while running the workload at the selected frequency, a performance metric for the workload type while running the workload at the selected frequency, or a minimum required power for the nodes on the list of selected nodes to perform the workload at the selected frequency.

8. The non-transitory computer readable storage medium of claim 7, wherein the selected frequency is a highest frequency at which the nodes on the list of selected nodes may operate such that a total power consumed by the nodes on the list of selected nodes does not exceed the available power while running the workload.

9. The non-transitory computer readable storage medium of claim 7, wherein the frequency estimate further includes an average power consumed by each node on the list of selected nodes while running the workload at a second frequency, a maximum power consumed by each node on the list of selected nodes while running the workload at the second frequency, an average power consumed by each node on the list of selected nodes while running the workload at a third frequency, and a maximum power consumed by each node on the list of selected nodes while running the workload at the third frequency,
wherein the second frequency is a next higher frequency than the selected frequency at which the nodes on the list of selected nodes were calibrated and the third frequency is a next lower frequency at which the nodes on the list of selected nodes were calibrated.

10. The non-transitory computer readable storage medium of claim 5, wherein the workload type includes a type of one of a small application, a portion of an application or a test script, wherein the small application, the portion of an application and the test script are used in a calibration of the nodes on the list of selected nodes.

11. The non-transitory computer readable storage medium of claim 5, wherein the input parameters further include an option for a selected frequency as one of a frequency resulting in a fastest performance metric or a frequency resulting in a most energy efficient metric.

12. The non-transitory computer readable storage medium of claim 11, wherein the frequency resulting in the fastest performance metric is a frequency at which the nodes on the list of selected nodes operate to complete a workload of the workload type in a fastest time.

13. The non-transitory computer readable storage medium of claim 11, wherein the frequency resulting in the most energy efficient metric is a frequency at which the nodes on the list of selected nodes operate to complete a workload of the workload type with a lowest aggregate power consumption among the nodes on the list of selected nodes.

14. A system for generating a power estimate for a distributed computer system comprising:
one or more processors; and
a storage module communicatively coupled to the one or more processors, the storage module comprises an estimator module to:
receive a plurality of input parameters, the plurality of input parameters including (i) a workload type, and (ii) a list of selected nodes belonging to the distributed computer system;
determine a lowest frequency for each node on the list of selected nodes;
generate the power estimate by (i) determining an average power consumption for each node on the list of selected nodes at the lowest frequency and (ii) scaling the average power consumption for each node on the list of selected nodes, wherein when the plurality of input parameters does not include a specified frequency, the lowest frequency is set to a lowest frequency for each node on the list of selected nodes that is associated with calibration data stored within a calibration database of the distributed computer system; and
provide the power estimate to a resource manager, wherein the power estimate includes a minimum required power to start processing of a job of the workload type.

15. The system of claim 14, wherein when the plurality of input parameters further includes a specified frequency, the lowest frequency is set to the specified frequency.

16. The system of claim 14, wherein when data associated with calibration of the nodes on the selected list of nodes for the workload type is determined to be present in a calibration database included in the distributed computer system, (i) an average workload power is determined for each node on the selected list of nodes based on calibration data associated with the workload type stored in the calibration database, and (ii) the average workload power for each node on the selected list of nodes is scaled and summated, wherein the summation is provided in the power estimate as a startup power.

17. The system of claim 14, wherein when data associated with calibration of the nodes on the selected list of nodes for the workload type is determined to not be present in a calibration database included in the distributed computer system, (i) an average maximum power is determined for each node on the selected list of nodes based on calibration data associated with a power-virus stored in the calibration database, and (ii) the average maximum power for each node on the selected list of nodes is scaled and summated, wherein the summation is provided in the power estimate as a startup power.

* * * * *